(12) United States Patent     (10) Patent No.: US 12,617,914 B2

Liu et al.     (45) Date of Patent: May 5, 2026

(54) COMPOSITE POLYMERIC FILM

(71) Applicant: Mylar Specialty Films U.S. Limited Partnership, Chester, VA (US)

(72) Inventors: Shengsheng Liu, Chester, VA (US); Erik Jevon Nelson, Chester, VA (US)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 717 days.

(21) Appl. No.: 17/915,544

(22) PCT Filed: Mar. 24, 2021

(86) PCT No.: PCT/IB2021/052423

§ 371 (c)(1),
(2) Date: Sep. 29, 2022

(87) PCT Pub. No.: WO2021/198852

PCT Pub. Date: Oct. 7, 2021

(65) Prior Publication Data

US 2023/0133260 A1     May 4, 2023

(30) Foreign Application Priority Data

Mar. 31, 2020    (GB) ...................................... 2004676

(51) Int. Cl.
C08J 7/052 (2020.01)
C08J 7/04 (2020.01)
(Continued)

(52) U.S. Cl.
CPC .............. C08J 7/052 (2020.01); C08J 7/042 (2013.01); C08J 7/043 (2020.01); C08K 5/0025 (2013.01);
(Continued)

(58) Field of Classification Search
CPC ... C08J 7/052; C08J 7/042; C08J 7/043; C08J 2377/02; C08J 2377/06; C08K 5/0025
See application file for complete search history.

(56) References Cited

U.S. PATENT DOCUMENTS

| 6,114,021 A | 9/2000 | Pankratz et al. |
| 2005/0031814 A1* | 2/2005 | Dawes ..................... B32B 7/06 |
| | | 428/347 |

(Continued)

FOREIGN PATENT DOCUMENTS

| CN | 103282203 A | 9/2013 |
| CN | 110641118 A | 1/2020 |

(Continued)

OTHER PUBLICATIONS

Search Report under Section 17(5) for GB Application No. 2004676.9 dated Sep. 18, 2020.

(Continued)

*Primary Examiner* — Blaine Copenheaver

(74) *Attorney, Agent, or Firm* — Wolf, Greenfield & Sacks, P.C.

(57) ABSTRACT

A composite film comprising a of amide substrate layer having a first and second surface, and a primer coating layer disposed on the first surface of the substrate layer, wherein the primer coating layer is derived from a composition comprising an acid copolymer resin, an organic crosslinker and an acid catalyst. A heat-sealable coating is applied on the primer.

26 Claims, 3 Drawing Sheets

(51) Int. Cl.
C08J 7/043 (2020.01)
C08K 5/00 (2006.01)

(52) U.S. Cl.
CPC ........ *C08J 2377/02* (2013.01); *C08J 2377/06* (2013.01); *C08J 2423/08* (2013.01); *C08J 2427/08* (2013.01); *C08J 2433/08* (2013.01)

(56) References Cited

U.S. PATENT DOCUMENTS

| | | | |
|---|---|---|---|
| 2009/0117362 A1 | 5/2009 | Schosseler et al. | |
| 2018/0009206 A1* | 1/2018 | Murase .................... | B32B 9/00 |

FOREIGN PATENT DOCUMENTS

| | | | |
|---|---|---|---|
| EP | 0 754 545 | A2 | 1/1997 |
| EP | 0 819 726 | A2 | 1/1998 |
| EP | 2 108 673 | A1 | 10/2009 |
| JP | 2000-238218 | A | 9/2000 |
| JP | 2011-175841 | A | 9/2011 |
| KR | 20140087746 | A | 7/2014 |
| WO | WO 02/00785 | A1 | 1/2002 |
| WO | WO 2013/116130 | A1 | 8/2013 |
| WO | WO 2016/022467 | A1 | 2/2016 |
| WO | WO 2021/198852 | A1 | 10/2021 |

OTHER PUBLICATIONS

International Search Report and Written Opinion for International Application No. PCT/IB2021/052423 dated Jun. 23, 2021.
International Preliminary Report on Patentability (Chapter II) for International Application No. PCT/IB2021/052423 dated Sep. 8, 2021.

* cited by examiner 10
5
4
3
2

10

COMPOSITE POLYMERIC FILM

CROSS-REFERENCE TO RELATED APPLICATIONS

This application is a national stage filing under 35 U.S.C. § 371 of International Application No. PCT/IB2021/052423, filed Mar. 24, 2021, which claims the benefit of United Kingdom Application No. GB 2004676.9, filed Mar. 31, 2020. International Application No. PCT/IB2021/052423, filed Mar. 24, 2021, is hereby incorporated herein by reference in its entirety.

Figure 1:
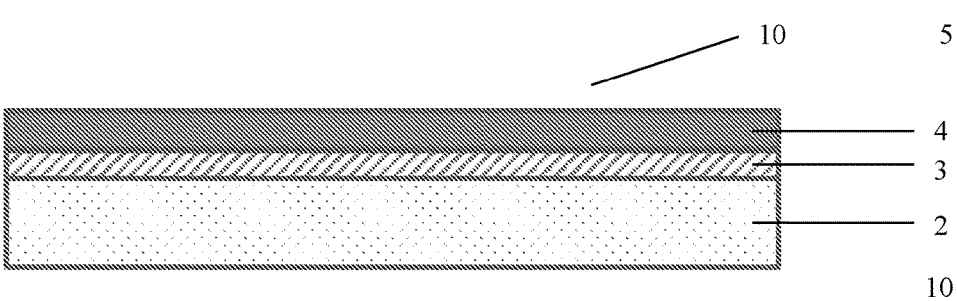
FIG. 1 shows a composite film (10), in which the composite film comprises a polyamide film (2), a primer coating layer (3) and a heat-sealable polymeric coating layer (4).

The present invention relates to composite polymeric films which comprise a polyamide substrate layer, and processes for the production thereof. The film is particularly suitable for use as a sealable film, particularly a sealable and peelable film for packaging applications, particularly for the packaging of food, such as ready-prepared ovenable meals. In particular, the film of the present invention is suitable for use as a lid for a container which contains a foodstuff such as a ready-prepared ovenable meal.

Plastic containers are commonplace in packaging applications, such as food packaging, and in particular for packaging convenience foods, for example ready-prepared ovenable meals which are warmed either in a microwave oven or in a conventional oven. Also known are "dual-ovenable" containers which may be warmed in either a microwave or a conventional oven. The container may be formed of polyester, such as polyethylene terephthalate (PET), polypropylene (PP) or polyethylene (PE) or may be PVDC-coated. A container in widespread use for ovenable meals is an APET/CPET container, which consists of a composite material having an amorphous PET layer on top of a crystalline PET layer. Other suitable types of container include a foil tray (particularly an aluminium foil tray), a metallised tray and a tray formed from PET-coated carton-board or paperboard. Of particular utility are trays formed from metallised (particularly flash-metallised) PET carton-board.

Such containers require lids which not only securely seal the container, in order to prevent leakage and drying out of the packaged contents, and to provide a protective barrier against insects, bacteria and air-borne contaminants during storage, but which are also able to be readily peeled from the container on opening. Other important requirements of the lids are that they should not stick to the packaged contents and that they should be able to withstand the heat generated in the oven. Container lids are typically made from composite films comprising a flexible polymeric substrate and a heat-sealable polymeric layer, and are often referred to as "lidding" films. The manufacture of sealed containers using lidding films involves the formation of a seal between the lidding film and the container. This seal is formed by placing the lid on top of the container and applying heat and pressure in order to soften or melt the sealable coating layer so that it adheres to the surface of the container and forms an effective seal between the lid and the container.

Polyamide film has been used as a flexible substrate for lidding films because of its excellent thermal stability, puncture resistance, chemical resistance and abrasion resistance. However, polyamide films are not readily heat-sealable and cannot be heat sealed below their melting point. Thus, it is necessary to use composite films. It is challenging to provide composite films consisting of a polyamide substrate and a heat-sealable polymeric layer because it has proven difficult to identify heat-sealable polymeric layers which can adhere directly to polyamide substrates and form good coating layers, particularly ones which exhibit the adhesive strength and cohesive strength required to provide good heat seal properties. For instance, the heat-sealable polymeric layer tends to delaminate and the continuous peel force tends to sharply decrease during the peel. Another problem with known composite films is that the films tend to exhibit poor peelability characteristics, in that the films typically do not exhibit a clean peel, i.e. residue of the heat-sealable layer is visible on the surface of the container after peeling the lidding film therefrom.

In order to improve the sealability characteristics, composite films may be provided with one or more additional polymer film interlayer(s) between the polyamide substrate and the heat-sealable polymeric layer. Typically, the polyamide substrates are laminated with heat-sealable coated polymer films, such as coated polyethylene terephthalate (PET) or coated polypropylene (PP) films. However, such composite films can only be formed via complex manufacturing processes requiring a thick gauge and multiple processing steps. The cost involved in manufacturing such composite films means that the application of polyamide lidding films is restricted. It would be desirable to dispense with the additional polymer film interlayer(s), and the additional process steps required to apply them, in order to increase manufacturing efficiency and reduce costs.

It is known to provide composite films comprising one or more additional primer layer(s) between a polymeric substrate and a heat-sealable polymeric layer. However, such composite films typically focus on polyester substrates. Furthermore, the primer layer(s) tend to require particularly specific formulations in order to provide the required adhesive properties. WO-2016/022467-A1 describes composite films comprising a polyester film substrate layer with a crosslinked layer on a surface thereof, further including a heat-sealable polymer layer on the crosslinked layer.

There remains a need to improve the sealability of polyamide films to containers. Therefore, it is an object of the present invention to provide a composite film with improved sealability to containers. Furthermore, it would be desirable to improve the adhesion bond strength between the layers within a heat-sealable composite film comprising a polyamide substrate, in order to reduce delamination and cohesive strength failure.

There remains a particular need to provide a film which exhibits excellent sealability and peelability to containers and which exhibits a "clean peel". As used herein, the term "clean peel" means that no or substantially no residue of the heat-sealable layer is visible on the surface of the container after peeling the lidding film therefrom. A clean peel is important from the perspective of the consumer, in order to avoid the impression that the contents of the container might be contaminated by the sealant material. Moreover, there remains a particular need to provide a film which exhibits excellent sealability and peelability characteristics and which is also optically clear, since optical clarity is perceived as a marker of quality, freshness and hygiene in respect of the product and the packaged goods.

According to a first aspect of the present invention, there is provided a composite film comprising a polyamide substrate layer having a first and second surface, and a primer coating layer disposed on the first surface of the substrate layer, wherein the primer coating layer is derived from a composition comprising an acid copolymer resin, an organic crosslinker and an acid catalyst.

The first surface of the polyamide substrate layer is the surface which faces the container when the film is used as a lidding film as described herein. The second surface of the polyamide substrate layer is the surface which is outermost, and which faces away from the interior of the container.

The substrate is a self-supporting film or sheet by which is meant a film or sheet capable of independent existence in the absence of a supporting base. The polyamide substrate may be cast. However, the polyamide substrate is preferably uniaxially or biaxially oriented, preferably biaxially oriented.

The polyamide of said polyamide substrate layer may be any suitable film-forming thermoplastic polyamide. Synthetic linear polyamides are preferred. The polyamide should be crystallisable. Suitable polyamides include homopolymers or copolymers selected from aliphatic polyamides and aliphatic/aromatic polyamides, particularly aliphatic polyamides. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Examples of aliphatic/aromatic polyamides include poly(tetramethylenediamine-co-isophthalic acid) (nylon 4,1), polyhexamethylene isophthalamide (nylon 6,1), hexamethylene adipamide/hexamethylene-isophthalamide (nylon 6,6/6I), hexamethylene adipamide/hexamethylene-terephthalamide (nylon 6,6/6T), poly(2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Preferred polyamides are linear aliphatic polyamides, preferably selected from: nylon 6,6; nylon 6; nylon 6.66;

nylon 6,10; nylon 6,4; and blends and mixtures thereof. Nylon 6 and nylon 6,6 are particularly preferred, and nylon 6,6 is most preferred.

Formation of the polyamide film may be effected by conventional techniques well-known in the art. Conveniently, formation of the substrate is effected by extrusion. In general terms, the process comprises the steps of extruding a layer of molten polyamide at elevated temperature (typically in the range of 250-265° C. for nylon 6), quenching the extrudate and orienting the quenched extrudate by drawing in at least one direction. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyamide tube which is subsequently quenched, reheated and then expanded by internal gas pressure to induce transverse orientation, and withdrawn at a rate which will induce longitudinal orientation. Suitable simultaneous biaxial orientation processes are disclosed in EP-2108673-A and US-2009/0117362-A1, the disclosure of which processes is incorporated herein by reference.

In the preferred flat film process, the film-forming polyamide is extruded through a slot die and rapidly quenched upon a chilled casting drum to ensure that the polyamide is quenched to the amorphous state. Orientation is then effected by stretching the quenched extrudate in at least one direction at a temperature above the glass transition temperature of the polyamide. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus.

Stretching is generally effected so that the dimension of the oriented film is from 2 to 8, more preferably 2.5 to 5 times its original dimension in the or each direction of stretching. Stretching is conventionally effected at temperatures higher than the Tg of the polyamide composition, preferably at least about 5° C. higher, preferably at least about 15° C. higher than the Tg, and preferably in the range of from about Tg+5° C. to about Tg+75° C., preferably from about Tg+5° C. to about Tg+30° C. It is not necessary to stretch equally in the machine and transverse directions, although this is preferred if balanced properties are desired.

A stretched film may be, and preferably is, dimensionally stabilised by heat-setting under dimensional support at a temperature above the glass transition temperature of the polyamide but below the melting temperature thereof, to induce the desired crystallisation of the polyamide. The actual heat-set temperature and time will vary depending on the composition of the film and its desired final thermal shrinkage but should not be selected so as to substantially degrade the toughness properties of the film such as tear resistance. Within these constraints, heat-setting is typically conducted at a temperature from about 80° C. less than the melting temperature of the film (i.e. TM−80° C.) to about 10° C. less than TM (i.e. TM−10° C.), preferably from at least about TM−70° C., preferably from at least about TM−60° C., preferably from at least about TM−50° C., preferably to about TM−20° C.

The stretched film is then cooled in order induce the desired crystallinity of the polyamide.

The polyamide substrate may further comprise any other additive conventionally employed in the manufacture of polymer films. Thus, agents such as particulate fillers, hydrolysis stabilisers, anti-oxidants, UV-stabilisers, cross-linking agents, dyes, lubricants, radical scavengers, thermal stabilisers, surface active agents, gloss improvers, prodegradents, viscosity modifiers and dispersion stabilisers may be incorporated as appropriate. Of particular utility are particulate fillers.

Particulate fillers can improve handling and windability during manufacture and/or modulate optical properties, as is well known in the art. The particulate filler is typically a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). A particulate inorganic filler is preferably finely-divided, and the volume distributed median particle diameter (equivalent spherical diameter corresponding to 50% of the volume of all the particles, read on the cumulative distribution curve relating volume % to the diameter of the particles—often referred to as the "D(v, 0.5)" value) thereof is preferably in the range from 0.01 to 5 $\mu$m, more preferably 0.05 to 1.5 $\mu$m, and particularly 0.15 to 1.2 $\mu$m. Preferably at least 90%, more preferably at least 95% by volume of the inorganic filler particles are within the range of the volume distributed median particle diameter±0.8 $\mu$m, and particularly ±0.5 $\mu$m. Particle size of the filler particles may be measured by electron microscope, coulter counter, sedimentation analysis and static or dynamic light scattering. Techniques based on laser light diffraction are preferred. The aforementioned conventionally employed additives may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed. Other slip-aids or anti-blocking agents which improves the handling of the film include paraffin wax, carnauba wax, kemamide and other long-chain aliphatic amides. Particulate inorganic fillers and other slip aids are present in relatively minor amounts, typically less than 5.0 wt %, typically less than 2.0 wt %, typically less than 1.0 wt %.

The film-forming polyamide is preferably the major component of the polyamide substrate, and makes up at least 70% by weight of the total weight of the substrate, preferably at least 80%, preferably at least 85%, preferably at least 90%, preferably at least 95%, more typically at least 98%, more typically at least 99% by weight of the total weight of the substrate.

The thickness of the polyamide substrate is preferably from about 5 to about 150 $\mu$m, preferably from about 10 to about 100 $\mu$m, and preferably from about 11 to about 50 $\mu$m, and preferably from about 12 to about 30 $\mu$m.

The primer coating layer is derived from a composition comprising an acid copolymer resin, an organic crosslinker and an acid catalyst.

The acid copolymer resin may be selected from one or more of ethylene/acrylic acid (EAA) copolymers; ethylene acrylate copolymers functionalized with COOH groups; ethylene/methacrylic acid (EMAA) copolymers; methyl acrylate/acrylic acid (MAAA) copolymers; and ethylene/vinyl acetate (EVA) copolymers functionalized with COOH groups.

Suitable EAA copolymers may contain any relative amount of ethylene and acrylic acid comonomers in polymerized form. Typically, the copolymers comprise from about 1 to about 30 wt % of acrylic acid comonomer. In one embodiment, the EAA copolymer consists of, or consists essentially of, ethylene and acrylic acid co-monomers. However, the copolymers may further comprise one or more additional co-monomers. Such additional co-monomers include, for instance, alkyl acrylates, preferably wherein the alkyl group is a $C_{1-10}$ alkyl group, such as methyl, ethyl, n-propyl, isopropyl, n-butyl, isobutyl, t-butyl, hexyl, 2-ethylhexyl, heptyl and n-octyl, and particularly methyl. Such additional co-monomers also include alkyl methacrylates (for instance methyl methacrylate). Any additional comonomer may be present in amounts of from about 1 to about 30 wt %. Where an additional comonomer is present, the combined amounts of the acrylic acid and the additional co-monomer(s) is typically no more than 50%, and typically no more than 30 wt %. Other additional co-monomers include acrylonitrile; methacrylonitrile; halo-substituted acrylonitrile; halo-substituted methacrylonitrile; acrylamide; methacrylamide; N-methylol acrylamide; N-ethanol acrylamide; N-propanol acrylamide; N-methacrylamide; N-ethanol methacrylamide; N-methylacrylamide; N-tertiary butyl acrylamide; hydroxyethyl methacrylate; glycidyl acrylate; glycidyl methacrylate; dimethylamino ethyl methacrylate; itaconic acid; itaconic anhydride; half ester of itaconic acid; vinyl esters such as vinyl acetate, vinyl chloracetate, vinyl benzoate, vinyl pyridine and vinyl chloride; vinylidene chloride; maleic acid; maleic anhydride; and styrene and derivatives of styrene such as chlorostyrene, hydroxystyrene and alkylated styrenes wherein the alkyl group is a $C_{1-10}$ alkyl group. Suitable EAA copolymers for use in the present invention may be selected from those available from ExxonMobil under the tradename ESCOR™, and/or those available from Michelman under the tradename Michem® Prime and/or those available from Dow Chemical under the tradename Primacor®.

Suitable ethylene acrylate copolymers functionalized with COOH groups comprise ethylene and acrylate comonomers and multiple COOH moieties per molecule. The copolymers thus comprise one or more comonomers other than the ethylene and acrylate comonomers in order to provide the COOH functionalization. Suitable additional comonomers are ethylenically unsaturated carboxylic acids, such as acrylic acid, methacrylic acid, maleic acid, fumaric acid and itaconic acid. In one embodiment, the functionalized ethylene acrylate copolymer may consist of, or consist essentially of, ethylene comonomer, acrylate comonomer and the comonomer(s) providing the COOH functionality.

A suitable ethylene acrylate copolymer functionalized with COOH groups for use in the present invention is the Bynel® 2022 copolymer (available from DuPont) which is an acid-modified ethylene acrylate.

Suitable EMAA copolymers may contain any relative amount of ethylene and methacrylic acid comonomers in polymerized form. Typically, the copolymers comprise from about 1 to about 30 wt % of methacrylic acid comonomer. Preferably, the copolymers comprise at least 5 wt % of methacrylic acid comonomer. Preferably, the copolymer comprises at most 20 wt %, preferably at most 15 wt %, preferably at most 10 wt % of methacrylic acid comonomer.

In one embodiment, the EMAA copolymer consists of, or consists essentially of, ethylene and methacrylic acid comonomers. However, the EMAA copolymers may further comprise one or more additional comonomers, as defined above with respect to the EAA copolymers. Suitable EMAA copolymers for use in the present invention may be selected from those available from DuPont under the tradename Nucrel®. A suitable EMAA copolymer for use in the present invention is the Nucrel® 960 copolymer (available from DuPont) which comprises 15 wt % of methacrylic acid comonomer.

Suitable MAAA copolymers may contain any relative amount of methyl acrylate and acrylic acid comonomers in polymerized form. Typically, the copolymers comprise from about 1 to about 30 wt % of acrylic acid comonomer. Preferably, the copolymers comprise at least 5 wt % of acrylic acid comonomer. Preferably, the copolymer comprises at most 20 wt %, preferably at most 15 wt %, preferably at most 10 wt % of acrylic acid comonomer. In one embodiment, the MAAA copolymer consists of, or consists essentially of, methyl acrylate and acrylic acid comonomers. However, the MAAA copolymers may further comprise one or more additional comonomers, as defined above with respect to the EAA copolymers.

Suitable ethylene vinyl acetate (EVA) copolymers functionalized with COOH groups comprise ethylene and vinyl acetate comonomers and multiple COOH moieties per molecule. The copolymers thus comprise one or more comonomers other than the ethylene and vinyl acetate comonomers in order to provide the COOH functionalization. Suitable additional comonomers are ethylenically unsaturated carboxylic acids, such as acrylic acid, methacrylic acid, maleic acid, fumaric acid and itaconic acid. In one embodiment, the functionalized EVA copolymer may consist of, or consist essentially of, ethylene comonomer, vinyl acetate comonomer and the comonomer(s) providing the COOH functionality. Specific groups that may be excluded from the functionalized EVA copolymer include halogen-containing groups, sulfur-containing groups, phosphorus-containing groups, and substituted or unsubstituted acrylamide or methacrylamide groups, for example N-methylol acrylamide.

Typically, the EVA copolymers functionalized with COOH groups comprise from about 9 wt % to about 40 wt % of vinyl acetate comonomer and from about 0.1 wt % to about 5 wt % of the one or more ethylenically unsaturated carboxylic acids. Preferably, the copolymers comprise at least 15 wt %, preferably at least 20 wt %, preferably at least 25 wt % of vinyl acetate comonomer. Preferably, the copolymers comprise at most 40 wt %, preferably at most 35 wt %, preferably at most 30 wt % of vinyl acetate comonomer. Preferably, the copolymers comprise at least 0.5 wt %, preferably at least 0.7 wt %, preferably at least 1.0 wt % of the one or more ethylenically unsaturated carboxylic acids. Preferably, the copolymers comprise at most 4.0 wt %, preferably at most 3.0 wt % of the one or more ethylenically unsaturated carboxylic acids.

Suitable EVA copolymers functionalized with COOH groups for use in the present invention may be selected from those available from DuPont under the tradename Elvax® EVA Acid Terpolymers, such as Elvax® 4260, Elvax® 4310, Elvax® 4320 and Elvax® 4355, preferably Elvax® 4260. Elvax® 4260 copolymer (available from DuPont), comprises 28% vinyl acetate, 71% ethylene and about 1% methacrylic acid units.

Another suitable EVA copolymer functionalized with COOH groups for use in the present invention is the Bynel® 3101 copolymer (available from DuPont), which is an acid/acrylate-modified ethylene vinyl acetate (EVA).

Preferably the primer coating layer comprises at least about 60% by weight, preferably at least about 62% by weight, preferably at least about 75% by weight, preferably at least about 80% by weight, preferably at least about 89% by weight, preferably at least about 92% by weight, preferably at least about 93% by weight of the acid copolymer resin based on the total weight of the primer coating layer. Preferably the primer coating layer comprises no more than about 99.9% by weight, preferably no more than about 99.98% by weight, preferably no more than about 99% by weight, preferably no more than about 98.9% by weight, preferably no more than about 96% by weight, preferably no more than about 95% by weight, preferably no more than about 94.5% by weight of the acid copolymer resin based on the total weight of the primer coating layer.

Preferably, the primer coating layer comprises from about 60% to about 99.9%, preferably from about 62% to about 99.98%, preferably from about 75% to about 99%, preferably from about 80 to about 98.9%, preferably from about 89% to about 96% by weight, preferably from about 92% to about 95% by weight, most preferably from about 93 to about 94.5% by weight of the acid copolymer resin based on the total weight of the primer coating layer.

The composition from which the primer coating layer is derived further comprises an organic crosslinker. The organic crosslinker comprises multiple reactive groups which are reactive with the acid functionality of the acid copolymer resin. For example, when the acid copolymer resin is EVA copolymer functionalized with COOH group, the organic crosslinker comprises multiple reactive groups which are reactive with said COOH groups.

The organic crosslinker may be selected from one or more of melamine crosslinking agents, polyisocyanate crosslinking agents, polycarbodiimide crosslinking agents, crosslinkers comprising multiple oxazoline groups and crosslinkers comprising multiple aziridine groups. Preferably, the organic crosslinker is a melamine crosslinking agent.

Suitable melamine crosslinking agents may be water-soluble melamine crosslinking agents or water-insoluble melamine crosslinking agents. Preferably, the organic crosslinker is a water-insoluble melamine crosslinking agent. Suitable melamine crosslinking agents for use in the present invention may be selected from those available from Cytec under the tradename Cymel®, such as Cymel® XW 3106 and Cymel® 350, preferably Cymel® XW 3106. Cymel® XW 3106 is a water insoluble, specifically alkylated high solids melamine resin. Cymel® 350 is a water soluble, highly methylate monomer melamine resin.

Suitable polyisocyanate crosslinking agents may be aliphatic polyisocyanates, such as hexamethylene diisocyanate (HI) trimers. Suitable polyisocyanate crosslinking agents for use in the present invention may be selected from those available from Bayer under the tradenames Desmodur® N3300 and Desmodur® N3600, and/or those available from Dow under the tradename MOR-FREE™ C33.

Suitable polycarbodiimide crosslinking agents for use in the present invention may be selected from those available from DSM NeoResins under the tradenames Solucote XL-1 and Crosslinker XL-1.

Suitable crosslinkers comprising multiple oxazoline groups may be polymers with oxazoline groups. Suitable polymers may be formed by the addition polymerization of a) oxazoline derivatives according to the structural formulae (I) to (III) below and b) at least one further comonomer.

(I)

(II)

(III)

wherein $R^6$, $R^7$, $R^8$ and $R^9$ may each be independently selected from the group consisting of hydrogen, halogen, alkyl, aralkyl, phenyl or substituted phenyl; and $R^{10}$ is a non-cyclic radical which contains a polymerizable double bond.

Examples of suitable halogens include fluorine, chlorine, bromine and iodine, preferably chlorine or bromine. Examples of suitable alkyl groups include methyl, ethyl, n-propyl, isopropyl, n-butyl, isobutyl, pentyl and hexyl groups. Examples of suitable aralkyl groups include those which comprise $C_{1-5}$ alkyl groups for example benzyl, phenethyl, benzhydryl and naphthylmethyl groups. Examples of suitable substituted phenyl groups may include chlorophenyl, bromophenyl, methoxyphenyl, ethoxyphenyl, methylaminophenyl, ethylaminophenyl, dimethylaminophenyl, methylethylaminophenyl and diethylaminophenyl. Examples of suitable non-cyclic radicals with polymerizable double bonds include vinyl and isopropenyl groups.

Thus, examples of suitable oxazoline derivatives a) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. Polymers bearing oxazoline groups may be prepared by using the oxazoline derivatives (a) either individually or in combination. Preferably, the oxazoline derivative (a) is 2-isopropenyl-2-oxazoline.

Any compound which is copolymerizable with oxazoline derivative (a) may be used as comonomer (b). Examples of suitable comonomers (b) include methacrylic esters such as methyl methacrylate, butyl methacrylate and 2-ethylhexyl methacrylate, unsaturated carboxylic acids such as methacrylic acid, itaconic acid and malonic acid, unsaturated nitriles such as methacrylonitrile, unsaturated amides such as methacrylamide and N-methylolmethacrylamide, vinyl esters such as vinyl acetate and vinyl propionate, vinyl ethers such as methyl vinyl ether, ethyl vinyl ether, alpha-olefins such as ethene, propene, halogenated alpha,beta-unsaturated compounds such as vinyl chloride, vinylidene chloride and vinyl fluoride, and also alpha,beta-unsaturated aromatic compounds such as styrene and alpha-methyistyrene. The comonomers (b) mentioned may be used either individually or in combination.

Suitable polymers containing oxazoline groups can be prepared, for example, by adding an oxazoline derivative (a), at least one comonomer (b) and a free-radical initiator, for example benzoyl peroxide or azoisobutyronitrile, to a suitable water-miscible organic solvent and heating the resulting solution. After the polymerization has ended, water can be added and the organic solvent can be removed completely or partially by distillation, to leave an aqueous polymer dispersion containing oxazoline groups, which is directly suitable for use in the adhesive coating of the present invention. Alternatively, it is also possible to polymerize oxazoline derivative(s) (a) and comonomer(s) (b) anionically, for example with n-butyllithium.

The content of oxazoline groups in the dried polymer is typically 0.5 to 10 mmol/g, preferably 1.5 to 8 mmol/g. The glass transition temperature of the dried polymer is in the range between 0 and 100° C., preferably 20 to 95° C.

Suitable crosslinkers comprising multiple oxazoline groups for use in the present invention may be selected from those available from Nippon Shokubai (Japan) under the trade name "EPOCROS®", in particular those which are available under the trade name "EPOCROS® WS", preferably EPOCROS® WS-300.

Suitable crosslinkers comprising multiple aziridine groups for use in the present invention may be selected from those available from DSM NeoResins under the tradename Crosslinker CX-100.

Preferably the primer coating layer comprises at least about 0.05% by weight, preferably at least about 0.1% by weight, preferably at least about 0.5% by weight, preferably at least about 1% by weight, preferably at least about 2% by weight, preferably at least about 3% by weight, preferably at least about 4% by weight, preferably at least about 5% by weight of the organic crosslinker based on the total weight of the primer coating layer. Preferably the primer coating layer comprises no more than about 25% by weight, preferably no more than about 23% by weight, preferably no more than about 20% by weight, preferably no more than about 18% by weight, preferably no more than about 16% by weight, preferably no more than about 15%, preferably no more than about 12% by weight of the organic crosslinker based on the total weight of the primer coating layer.

Preferably the primer coating layer comprises from about 0.05% to about 25%, preferably from about 0.1% to about 23%, preferably from about 0.5% to about 20%, preferably from about 1% to about 18%, preferably from about 2% to about 16%, preferably from about 3% to about 15%, preferably from about 4% to about 12%, preferably from about 5% to about 12% by weight of the organic crosslinker based on the total weight of the primer coating layer.

The composition from which the primer coating layer is derived further comprises an acid catalyst. Preferably, the acid catalyst is a strong acid, for example an acid having a pKa of no greater than −1.74. Alternatively, the acid catalyst may be a weak acid, for example an acid having a pKa of greater than −1.74. The acid catalyst may be an organic acid or an inorganic acid.

The acid catalyst may be selected from an organic sulfonic acid, sulphuric acid and ammonium nitrate.

Preferably the acid is an organic sulfonic acid, such as p-toluenesulfonic acid or dodecylbenzenesulfonic acid (DDBSA). Suitable p-toluenesulfonic acids for use in the present invention may be selected from those available from Cytec under the trade name "CYCAT®". Suitable dodecylbenzenesulfonic acids for use in the present invention may be selected from those available from King Industries, Inc. under the trade name "Nacure", such as Nacure 5076 or Nacure 5925. Nacure 5076 is a strong acid catalyst based on DDBSA, generally supplied at 70% active in Isopropanol. Nacure 5925 is an amine neutralized DDBSA catalyst.

The inventors of the present invention have found that the combination of the acid copolymer resin, the organic cross-linker and the acid catalyst in the composition is required in order to provide an effective primer coating layer. In particular, the inventors have found that the acid copolymer resin alone does not provide a primer coating layer having a sufficient adhesive bond strength to the polyamide substrate. Crosslinking of the acid copolymer resin by the organic crosslinker is required and, furthermore, the inventors have found that the acid catalyst is required in order to provide an effective crosslinking system.

Preferably the primer coating layer comprises at least about 0.01% by weight, preferably at least about 0.03% by weight, preferably at least about 0.05% by weight, preferably at least about 0.075% by weight, preferably at least about 0.1% by weight, preferably at least about 0.2% by weight, preferably at least about 0.3% by weight, preferably at least about 0.4% by weight, preferably at least about 0.5% by weight of the acid catalyst based on the total weight of the primer coating layer. Preferably the primer coating layer comprises no more than about 2% by weight, preferably no more than about 1.9% by weight, preferably no more than about 1.8% by weight, preferably no more than about 1.7% by weight, preferably no more than about 1.6% by weight, preferably no more than about 1.5% by weight, preferably no more than about 1.3% by weight of the acid catalyst based on the total weight of the primer coating layer.

Preferably the primer coating layer comprises from about 0.01% to about 2%, preferably from about 0.03% to about 1.9%, preferably from about 0.05% to about 1.8%, preferably from about 0.075% to about 1.7%, preferably from about 0.1 to about 1.6%, preferably from about 0.2 to about 1.5%, preferably from about 0.3 to about 1.3% by weight of the acid catalyst based on the total weight of the primer coating layer.

Thus, the primer coating layer preferably comprises the aforementioned components in the following amounts:

(i) the acid copolymer resin in an amount of from 60 to 99.9%, preferably from 75 to 95%, preferably from 92 to 95% of the layer;

(ii) the organic crosslinker in an amount of from 0.05 to 25%, preferably from 0.5 to 20%, preferably from 4 to 12% of the layer;

(iii) the acid catalyst in an amount of from 0.01 to 2%, preferably from 0.05 to 1.8%, preferably from 0.1 to 1.6% of the layer.

It will be appreciated that the above amounts relate to the amount by weight of each component in the finished primer coating layer (i.e. the dry weight of the primer coating layer).

The primer coating layer may also comprise a slip-aid or anti-blocking agent which improves the handling of the film, as is conventional in the art of sealant coatings. Suitable slip-aids or anti-blocking agents include Carnauba wax, kemamide and silica. Such components are present in relatively minor amounts, typically no more than 5.0 wt %, typically no more than 2.0 wt %.

The primer coating layer may also comprise a tackifying resin. The tackifying resin is believed to improve the cohesive strength of the primer coating layer and/or improve the adhesive strength of the primer coating layer to the polyamide substrate layer. In general, suitable tackifying resins for the primer coating layer disclosed herein are selected from synthetic and natural polyterpenes, hydrocarbon resins, rosin and rosin ester resins, and combinations thereof. The tackifying resins suitably exhibit ring and ball softening points from 20° C. to 160° C., preferably 90° C. to 125° C. (preferably tested according to the procedure taught in ASTM E28-18). The number average molecular weights of the tackifying resins are preferably at least 200 or 500, and preferably at most 5000, 2000, or 1000. Molecular weight is suitably measured by conventional GPC techniques, preferably using a polystyrene (PS) standard. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, MA, USA) and THF as mobile phase.

Suitable natural polyterpene tackifying resins are based on natural and renewable feedstocks, including alpha-pinene, beta-pinene and d-limonene. Examples include:

1) Piccolyte® C resin (C85, C105, C115, C125, C135), Piccolyte® F resin (F105, F115), Piccolyte® A resin (A25, A115, A125, A135), Piccolyte® S resin (S25, S85, 5115, 5125, S135); all available from Pinova.

2) Sylvares® TR resin (A25L, 90, 105, 7115, 7125); all available from Arizona Chemical.

Such tackifying resins are typically present in an amount of from about 15 to about 50 wt % of the layer, preferably from about 15 to about 40 wt %, typically from about 30 to about 40 wt % based on the total weight of the primer coating layer.

When such tackifying resins are present, the acid copolymer resin is preferably present in amounts of no more than about 80% by weight, preferably no more than about 70% by weight, preferably no more than about 65% by weight based on the total weight of the primer coating layer.

The composition from which the primer coating layer is derived may comprise an acid copolymer resin, an organic crosslinker, an acid catalyst and a coating vehicle (as well as optional components such as a slip-aid, anti-blocking agent and/or tackifying resin). Typically, the acid copolymer resin, organic crosslinker and acid catalyst are dispersed or dissolved in the coating vehicle. The coating vehicle can be any suitable coating vehicle, particularly a coating vehicle with a high boiling point. The coating vehicle preferably comprises, or consists of, an organic solvent, preferably toluene, xylene and/or chlorobenzene.

Polyamide substrates tend to have high static readings which can cause safety issues during such coating processes involving the use of a coating vehicle (e.g. solvent) based composition. Appropriate safety precautions should be taken to avoid static accumulation and dissipation and other possible ignition sources during the coating process. For instance, the coating vehicle may comprise tetrahydrofuran (THF) as a conductive solvent to reduce the risk of static dissipation.

Typically, it is necessary to heat the composition in order to disperse or dissolve the acid copolymer resin, organic crosslinker and acid catalyst in the coating vehicle. Accordingly, the coating vehicle should be selected such that it can easily be heated to the temperatures required to dissolve the acid copolymer resin.

In view of the high temperatures required to dissolve EAA, the acid copolymer resin is preferably selected from one or more of ethylene acrylate copolymers functionalized with COOH groups; ethylene methacrylic acid (EMAA) copolymers; methyl acrylate acrylic acid (MAAA) copolymers; and ethylene vinyl acetate (EVA) copolymers functionalized with COOH groups, because such acid copolymer resins are typically compatible with a wider range of coating vehicles. Preferably, the acid copolymer resin is selected from one or more of ethylene methacrylic acid (EMAA) copolymers; methyl acrylate acrylic acid (MAAA) copolymers; and ethylene vinyl acetate (EVA) copolymers functionalized with COOH groups. Preferably, the acid copolymer resin is ethylene vinyl acetate (EVA) copolymers functionalized with COOH groups.

The composition preferably comprises the coating vehicle in an amount of from about 5 to about 30, preferably from about 7 to about 25, preferably from about 10 to about 20 wt % of the composition based on the total weight of the composition as determined prior to drying the composition.

The primer coating layer preferably has a dry thickness (i.e. the thickness of the primer coating layer in the finished composite film) of about 0.1 to about 1.0 µm.

The composite film of the present invention is preferably manufactured by a method comprising:

(i) disposing a primer coating layer composition comprising an acid copolymer resin, an organic crosslinker and an acid catalyst in a coating vehicle onto a surface of a polyamide substrate;

(ii) drying the primer coating layer composition;

(iii) heating the dried primer coating layer composition to form a cured primer coating layer.

The primer coating layer composition may be disposed onto the polyamide substrate using any suitable coating technique, typically roll coating, and including gravure roll coating and reverse roll coating, or by any spray-coating technique conventional in the art. Coating may be, and preferably is, conducted "off-line", i.e. after stretching and any subsequent heat-setting employed during manufacture of the polyamide substrate, or "in-line", i.e. wherein the coating step takes place before, during or between any stretching operation(s) employed. When coating is performed in-line, it is preferably performed between the forward and sideways stretches of a biaxial stretching operation ("inter-draw" coating).

The primer coating layer composition is preferably applied to the polyamide substrate at a coat weight of from about 0.1 $g/m^2$ to about 1.0 $g/m^2$, preferably from about 0.3 $g/m^2$ to about 0.7 $g/m^2$, typically no more than about 0.5 $g/m^2$.

It will be appreciated that the drying and curing steps (steps (ii) and (iii)) may be conducted separately and sequentially, or may be combined into a single heat-treatment.

In one embodiment, drying and curing of the primer coating composition are performed simultaneously at a temperature of from about 100° C. to about 250° C., preferably from about 100° C. to about 200° C., preferably from about 125° C. to about 150° C.

The composite film of the present invention may be used in the manufacture of sealable films, particularly sealable and peelable films for packaging applications. An advantage of the composite film described herein is that the film (specifically the primer coating layer) exhibits surprisingly good adhesion to both the polyamide substrate and to subsequently applied heat-sealable coating layers. Thus it is possible to adhere the primer coating layer directly to a heat-sealable coating layer, without the need for one or more additional laminated polyester or polyolefin film interlayer(s).

Therefore, according to a second aspect of the present invention, there is provided a composite film comprising a polyamide substrate layer having a first and second surface; a primer coating layer disposed on the first surface of the substrate layer, wherein the primer coating layer is derived from a composition comprising an acid copolymer resin, an organic crosslinker and an acid catalyst; and a heat-sealable polymeric coating layer disposed on the primer coating layer.

The present inventors have unexpectedly found that use of the primer coating layer described herein means that it is possible to adhere a polyamide film via the primer coating layer to a heat-sealable polymeric coating layer without the need for one or more laminated polymer interlayer(s). It will be appreciated that the composite film as described hereinabove is not made by a lamination process, but by a coating process. Thus, the heat-sealable polymeric coating layer and primer coating layer are disposed (on the primer coating layer and on the polyamide substrate respectively) by a coating technique, rather than by a lamination technique. Advantageously, this reduces the thickness of the composite film. The composite film exhibits good delamination resistance because there is good adhesion between the polyamide substrate and the primer coating layer, and good adhesion between the primer coating layer and the heat-sealable polymeric coating layer. The composite film of the second aspect of the present invention is suitable for use as a sealable film for packaging applications because there is good adhesion between the composite film and the container. Furthermore, the present inventors have found that the composite film of the second aspect of the present invention exhibits excellent sealability and peelability to containers and exhibits a "clean peel".

The first surface of the polyamide substrate layer is the surface which faces the container when the composite film is used as a lidding film as described herein. The second surface of the polyamide substrate layer is the surface which is outermost, and which faces away from the interior of the container. Accordingly, the heat-sealable polymeric coating layer faces the container when the composite film is used as a lidding film as described herein.

This invention is illustrated by reference to FIG. 1 showing a composite film (10), in which the composite film comprises a polyamide film (2), a primer coating layer (3) and a heat-sealable polymeric coating layer (4).

The heat-sealable polymeric coating layer disposed on the primer coating layer is capable of forming a heat-seal bond to the surfaces of a container, particularly a polyolefin or polyester container. The polymeric material of the heat-sealable coating layer is capable of softening to a sufficient extent on heating that its viscosity becomes low enough to allow adequate wetting for it to adhere to the surface to which it is being bonded.

As used herein, the term "heat-sealable" refers to the ability to form a heat-seal bond by contacting the heat-sealable film with the surface to which it is to be bonded at a temperature of no more than 250° C. (preferably no more than 230° C., and preferably within the range of 150 to 200° C.) and a pressure of no more than about 1000 kPa (preferably no more than 700 kPa, preferably no more than 550 kPa, preferably no more than 210 kPa) for a time of no more than 5 seconds (preferably no more than 1 second, preferably no more than 0.3 seconds), preferably wherein the resulting bond strength is at least 10 g/mm (preferably at least 20 g/mm, preferably at least 30 g/mm).

The heat-sealable polymeric coating layer may be formed from any polymeric material suitable as a heat-sealable coating on a polyamide substrate. Suitable heat-sealable polymeric coatings include polyvinylidene chloride (PVDC), ethylene vinyl acetate (EVA), polyolefins, ethylene-acrylic acid copolymers and ethylene-methacrylic acid copolymers. EVA and PVDC coatings are particularly preferred, and especially EVA coatings.

Suitable EVA polymers for the heat-sealable coating layer include the EVA polymers commercially available as Elvax™ resins (DuPont). Typically, the EVA resin has a vinyl acetate content in the range of 9% to 40%, and typically 15% to 30%.

PVDC heat-sealable coatings are well known in the art, and suitable PVDC materials for the heat-sealable coating are copolymers of vinylidene chloride with other monomers. A vinylidene chloride copolymer is typically obtained as a latex dispersed in a medium by polymerizing using conventional emulsion polymerization methods 50 to 99% by mass of vinylidene chloride as a starting material and 1 to 50% by mass of one or more other monomers copolymerizable with vinylidene chloride. The higher the proportion of vinylidene chloride, the higher the crystalline melting point of the vinylidene chloride copolymers. Examples of the copolymerizable monomer include: vinyl chloride; acrylic acid esters such as methyl acrylate, ethyl acrylate, butyl acrylate, 2-ethylhexyl acrylate and 2-hydroxyethyl acrylate; methacrylic acid esters such as methyl methacrylate and glycidyl methacrylate; acrylonitrile and methacrylonitrile; and unsaturated carboxylic acids such as acrylic acid, methacrylic acid, itaconic acid and maleic acid. One or two or more of such monomers may be used. The solid content concentration of the vinylidene chloride copolymer mixture latex can be appropriately altered according to the specifications of the coating apparatus or the drying-heating apparatus, and is preferably in a range from 10 to 70% by mass and more preferably in a range from 30 to 55% by mass.

Formation of the heat-sealable polymeric coating layer is effected by coating a heat-sealable coating formulation on to the primer coating layer, using the coating processes discussed hereinabove. The components of the heat-sealable polymeric coating are typically dispersed or dissolved in a coating vehicle, which may be water or an organic solvent or a mixture thereof. The coating formulation preferably comprises the coating vehicle in an amount of from about 5 to about 30, preferably about 10 to about 25, preferably about 15 to about 20 wt % of the coating formulation.

The heat-sealable polymeric coating may comprise any of the additives conventionally used in sealant coatings, particularly anti-blocking agents such as the aforementioned particulate inorganic fillers and organic slip aids, which are usually present in relatively minor amounts, typically less than 5.0 wt %, typically less than 2.0 wt %. The heat-sealable coating may further comprise one or more surfactant(s) to improve the wetting of the substrate. Examples of suitable surfactants include: anionic surfactants such as polyethylene alkyl phenyl ether, polyoxyethylene-fatty acid ester, glycerin fatty acid ester, sorbitan fatty acid ester, fatty acid metal soaps, alkyl sulfuric acid salts, alkylsulfonic acid salts and alkylsulfosuccinic acid slats; and nonionic surfactants such as acetylene glycol. The heat-sealable coating may further comprise the aforementioned tackifying resins.

The heat-sealable polymeric material preferably constitutes at least 90%, preferably at least 95%, typically at least 98% of the coating layer which it forms.

The thickness of the heat-sealable coating layer is preferably no more than about 45%, more preferably no more than about 40% and more preferably no more than about 30%, and preferably at least about 5% more preferably at least about 10%, and preferably from about 15% to about 30%, of the total thickness of the composite film. Typically, the heat-sealable coating layer has a thickness of up to about 25 μm, more preferably up to about 15 μm, more preferably up to about 10 μm, more preferably up to about 6 μm, more preferably up to about 5 μm, more preferably up to about 4 μm. Typically, the heat-sealable coating layer has a thickness of at least about 1 μm, preferably of at least about 1.5 μm, preferably of at least about 2 μm. More preferably, the heat-sealable coating layer has a thickness of between about 2 and about 6 μm, and more preferably between about 2 and about 4 μm.

The composite film of the second aspect preferably has a total thickness of no more than 60 μm, preferably of no more than 35 μm.

The composite film preferably consists essentially of, and preferably consists of, the polyamide substrate layer, the primer coating layer and the heat-sealable polymeric coating layer.

Preferably, the composite film of the present invention is optically clear. As used herein, the term "optically clear" refers to a layer that provides a percentage of scattered light in the visible wavelength range of no more than 10%, preferably no more than 8%, preferably no more than 5% preferably no more than 4%, preferably no more than 3%, preferably no more than 2%, more preferably no more than 1%, and/or a total luminous transmission (TLT) for light in the visible region (400 nm to 700 nm) of at least 80%, preferably at least 88%, more preferably at least about 90%, more preferably at least about 92%. Preferably, an optically clear film fulfils both of these criteria. In this embodiment, any filler in the film is typically present in only small amounts, generally not exceeding 2.5%, preferably not exceeding 2.0%, preferably not exceeding 1.1%, preferably not exceeding 0.6% and preferably not exceeding 0.3% by weight of a layer, preferably wherein the filler is silica. In this embodiment, the windability of the film (i.e. the absence of blocking or sticking when the film is wound up into a roll) is improved, without an unacceptable reduction in haze or other optical properties. An optically clear film is particularly advantageous for a lidding film, since such films give the impression of freshness and hygiene to the consumer.

The composite film preferably exhibits a heat-seal strength as defined herein to a PP or CPET tray in the range of 400 to 1600, preferably at least 500, preferably at least 600 g/inch. Preferably, the heat-seal strength of the film to a standard PP or CPET tray is in the range of 500-1000 g/inch, preferably 600-800 g/inch. Preferably, the composite film exhibits such heat-seal strengths at 350° F. (approx. 177° C.).

The composite film of the second aspect of the present invention is useful for sealing or providing a lid on a receptacle for packaging convenience or ready-prepared foods, for example ovenable meals which are warmed either in a microwave or a conventional oven. The receptacle may be a container such as a thermoformed tray or bowl, and may be formed of the tray materials described hereinabove.

The composite film of the second aspect of the present invention is useful for packaging, for example bags for storing a food product and/or for cooking a food product. The bag may be formed of the composite film described hereinabove.

The description and preferences of the first aspect are equally applicable to the second aspect.

In a third aspect, the present invention provides a sealed container comprising a receptacle containing a food product, particularly an ovenable meal, and a lid formed from a composite film as described in the second aspect herein, particularly wherein the receptacle is made from CPET or a polyolefin, particularly PP or PE, and particularly PP. The sealed container is produced by techniques well-known to those skilled in the art. Once the food to be packaged has been introduced into the receptacle, the heat-sealable film lid is affixed using temperature and/or pressure using conventional techniques and equipment.

In a fourth aspect, the present invention provides the use of a composite film as described in the second aspect herein as a lid in the packaging of an ovenable meal, said packaging further comprising a receptacle, particularly wherein the receptacle is made from CPET or a polyolefin, particularly PP or PE, and particularly PP.

In a fifth aspect, the present invention provides a bag containing a food product, wherein the bag is formed from a composite film as described in the second aspect herein. The bag may be heat sealed to itself along at least one its sides and have an opening through which the food product is placed. Once the food to be packaging has been introduced into the bag, the opening of the bag may be sealed in any conventionally known manner. For instance, the heat-sealable composite film may be affixed to itself using temperature and/or pressure using conventional techniques and equipment. Alternatively, the bag may be provided with a closure which allows it to be opened and closed multiple times.

In a sixth aspect, the present invention provides the use of a composite film as described in the second aspect herein as a bag in the packaging of a food product.

The description and preferences of the first and second aspects are equally applicable to the third, fourth, fifth and sixth aspects.

Property Measurement

The following test methods may be used to characterise the composite film:

(i) Optical clarity is evaluated by measuring total luminance transmission (TLT) and haze (% of scattered transmitted visible light) through the total thickness of the film using an M57D spherical hazemeter (Diffusion Systems) according to the standard test method ASTM D1003-13.

(ii) Thermal shrinkage is assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature of 150° C. (by placing in a heated oven at that temperature) and holding for an interval of 30 minutes, it was cooled to room temperature and its dimensions re-measured manually. The thermal shrinkage was calculated and expressed as a percentage of the original length.

(iii) Glass transition temperature ($T_g$) and crystalline melting point ($T_m$) were measured by differential scanning calorimetry (DSC) using a PerkinElmer HyperDSC 8500. Unless otherwise stated, measurements were made according to the following standard test method and based on the method described in ASTM E1356-98. The sample was maintained under an atmosphere of dry nitrogen for the duration of the scan. A flow rate of 20 ml min$^{-1}$ and Al pans were used. Samples (5 mg) were heated at 20° C./min from 20° C. to 350° C.

The value of a $T_g$ was determined as the extrapolated onset temperature of the glass transition observed on the DSC scans (heat flow (W/g) against temperature (° C.)), as described in ASTM E1356-98. The value of a $T_m$ was determined from the DSC scans as the peak endotherm of the transition.

(iv) Heat-seal strength was determined as follows. One half of an A4 sheet of film comprising a substrate layer, a primer coating layer and a heat-sealable polymeric coating layer was sealed to itself (coated side to coated side) using a Sentinel heat sealer (Model 12 by Packaging Industries Group Inc.). The heat sealer was operated for 0.5 seconds at 552 kPa (80 psi) with a 177° C. (350° F.) top jaw and a 38° C. (100° F.) bottom jaw. The sealed sample was marked and cut into 25 mm width strips, the folded portion was slit and the heat seal strength was determined by peel strength testing on an INSTRON® model 4464 test machine. The jaws were set 50 mm apart. The upper jaw held one piece of the sealed sample and travelled up at a speed of 250 mm/min, while the lower jaw held the other piece of the sealed sample and was stationary. The average force needed to separate the two pieces of film was recorded. Three sealed sample pieces were measured for each coated sample.

(v) Heat-seal strength to a PP or CPET container was determined as follows. A flat piece is cut from the PP or CPET container to provide a container substrate sample. An A4 sheet of film comprising a substrate layer, a primer coating layer and a heat-sealable polymeric coating layer was sealed to the container substrate (heat-sealable coating layer to container substrate) using a Sentinel heat sealer (Model 12 by Packaging Industries Group Inc.). The heat sealer was operated for 0.5 seconds at 552 kPa (80 psi) with a 177° C. (350° F.) top jaw and a 38° C. (100° F.) bottom jaw. The sealed sample was marked and cut into 25 mm width strips, the folded portion was slit and the heat seal strength was determined by peel strength testing on an INSTRON® model 4464 test machine. The jaws were set 50 mm apart. The upper jaw held the film piece of the sealed sample and travelled up at a speed of 250 mm/min, while the lower jaw held the container substrate piece of the sealed sample and was stationary. The average force needed to separate the film and the container substrate was recorded. Three sealed sample pieces were measured for each coated sample.

Unless otherwise indicated, all compositional percentages and ratios recited herein are on a weight basis and all coating weights refer to dried coating weights.

The invention is further illustrated by the following examples. It will be appreciated that the examples are for illustrative purposes only and are not intended to limit the invention as described above. Modification of detail may be made without departing from the scope of the invention.

EXAMPLES

The materials noted in Table 1 were used to prepare composite films:

TABLE 1

| Raw Material | Supplier | Description |
|---|---|---|
| Elvax ® 4260 | DuPont | EVA (28 wt % VA, 1 wt % methacrylic acid) |
| Nucrel ® 960 | DuPont | E/MAA (15 wt % methacrylic acid) |
| Bynel ® 2022 | DuPont | Acid-modified ethylene acrylate |
| Bynel ® 3101 | DuPont | Acid/acrylate-modified EVA |
| Cymel XW 3106 | Allnex | Water insoluble, specifically alkylated high solids melamine resin |
| p-Toluenesulfonic acid | Sigma-Aldrich | Acid catalyst (5% solution in THF) |
| Nacure ® 5076 | King Industries, Inc. | Acid catalyst based on DDBSA |
| Nacure ® 5925 | King Industries, Inc. | Amine neutralized DDBSA catalyst |
| Sulphuric acid | Sigma-Aldrich | Acid catalyst |
| Elvax ® 3185 | DuPont | EVA (32 wt % VA) |
| Piccolyte ® M115 | Pinova Solutions | Poly terpene resin, softening point 111-119° C. |
| Kemamide EZ | PMC Biogenix | Fatty amide slip-aid |
| Syloid ® 620 | W. R. Grace | Amorphous silica anti-blocking agent |
| Capran 1200 | AdvanSix | Biaxially oriented nylon 6 film, 12 μm |

Comparative Examples 1 to 2; Examples 3 to 12

A biaxially oriented nylon 6 film was obtained (Capran 1200, available from AdvanSix). The nylon 6 film thickness was 12 μm. A substrate of A4 size was prepared.

A range of composite films were prepared by coating a primer coating layer having the compositions shown in Table 2 onto one surface of the nylon 6 film as described above. For instance, the primer coating layer of Example 3 was prepared by dissolving 9.45 g of Elvax® 4260 in 89.05 g of toluene at 60° C., followed by adding 0.05 g of p-Toluenesulfonic acid monohydrate and 0.5 g of Cymel XW 3106.

The amounts of the components of the coating formulation shown in Table 2 are the amounts by weight of each component in the finished primer coating layer (i.e. the dry weight of the primer coating layer). The coating formulations in Table 2 were prepared at 10 wt % in toluene. The coating was conducted off-line using a Meyer coating rod at a coat weight of 0.7 g/m² to one surface of the nylon 6 film. The primer coating layer composition was transferred to a forced air oven preset at 150° C. for drying and curing for 3 min. The composite film was cooled down to room temperature.

A heat-sealable polymeric coating layer was then coated onto the cured primer layer of the range of composite films as described above. The heat-sealable polymeric coating composition was prepared by dissolving 31 g of Elvax® 3185, 0.3 g of Syloid® 620 and 0.5 g of Kemamide EZ in 200 mL of toluene at 60° C. The coating was conducted off-line using a Meyer coating road at a coat-weight of 6.5 g/m². The heat-sealable polymeric coating layer composition was transferred to a forced air oven preset at 115° C. for drying for 2 min.

The final composite film was heat-sealed (350° F.; dwell time 0.5 second; pressure 80 psi) to itself, to a PP substrate and to a C-PET substrate and the peel strengths of the composite films were tested as described herein. The results are provided in Table 2.

The composite films according to the present invention exhibited an easy and clean peel when peeled from the container substrate. In contrast, the films of Comparative Examples 1 and 2 left a coating residue on the substrate after peeling.

In addition, the inventive examples were found to exhibit superior peel strength across all peel strengths tested compared to the composite film of Comparative Example 1 (no organic crosslinker or acid catalyst in the primer coating layer) and to the composite film of Comparative Example 2 (no acid catalyst in the primer coating layer).

Comparative Example 3; Example 13

Figure 2A:
FIG. 2A shows the evaluation of the peelability of the composite film of Comparative Example 3 to a polypropylene (PP) substrate.
Figure 2B:
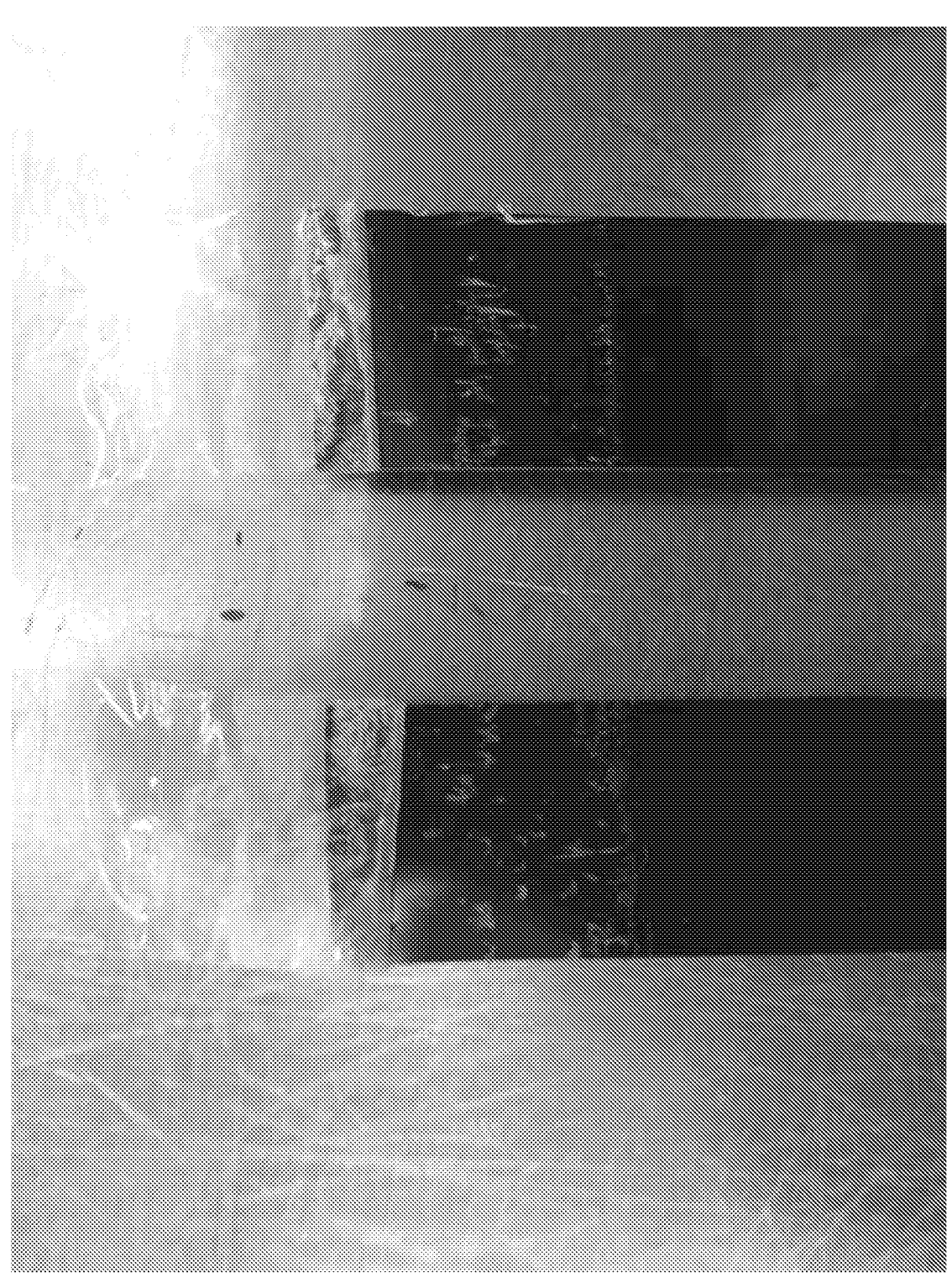
FIG. 2B shows the evaluation of the peelability of the composite film of Comparative Example 3 to a crystalline polyethylene terephthalate (CPET) substrate.

The composite film of Comparative Example 3 was prepared by disposing the heat-sealable polymeric coating composition directly on the polyamide substrate. Thus, the comparative composite film did not comprise a primer coating layer. The peelability of the composite film to a PP substrate and to a CPET substrate was evaluated as shown in FIGS. 2A and 2B respectively. The composite film did not exhibit a clean peel when manually peeled from the substrates, which can be seen by the spotting and residue of the heat-sealable coating layer visible on the surface of the PP and CPET substrate.

Figure 3:
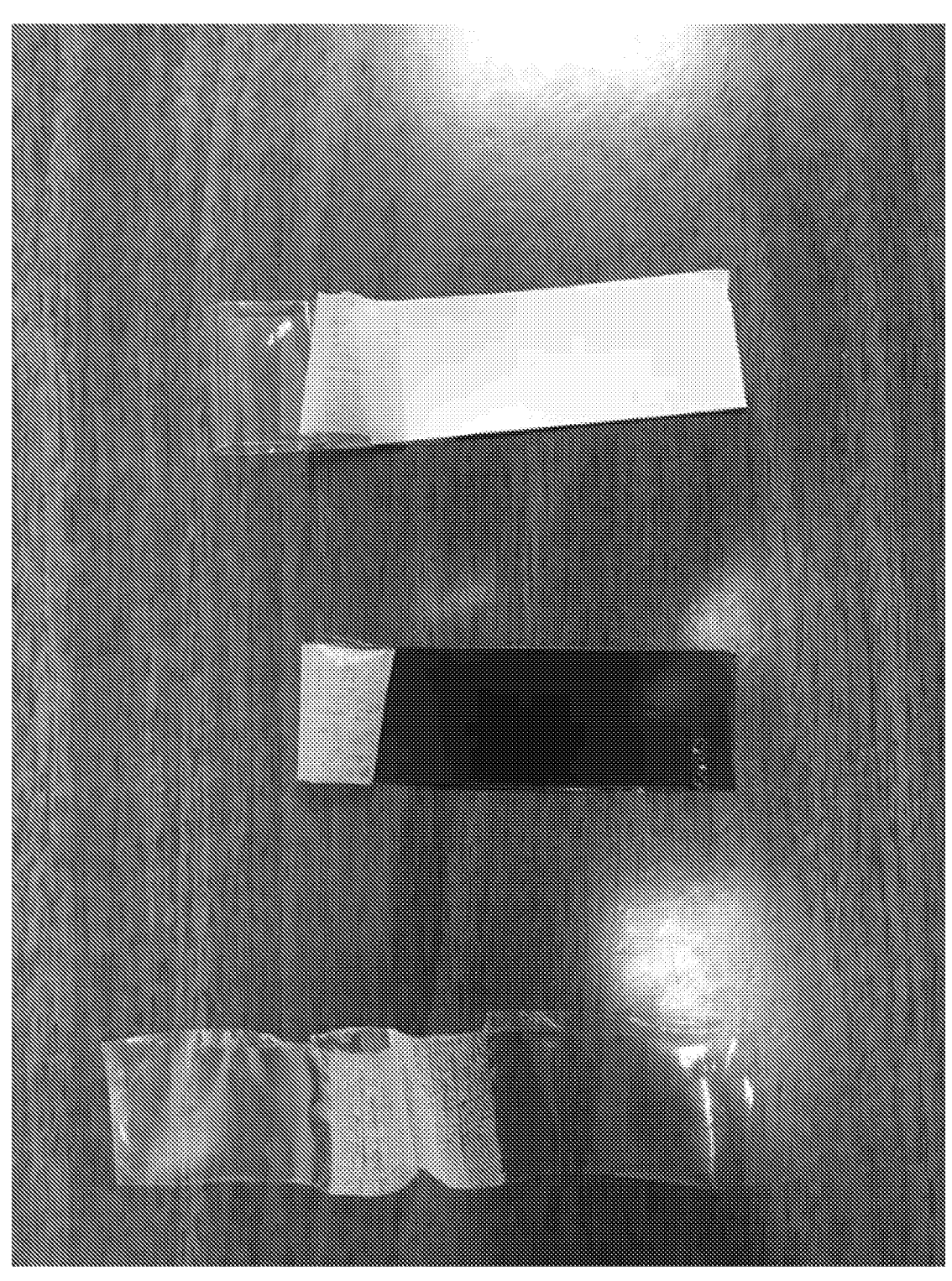
FIG. 3 shows the evaluation of the peelability of the composite film of Example 13 to itself, to a CPET substrate and to a PP substrate (left to right).

A composite film of Example 13 was provided wherein the primer coating layer was disposed on the first surface of the polyamide substrate and then the heat-sealable polymeric coating layer was disposed on the primer coating layer. The peelability of the composite film to itself, to a CPET substrate and to a PP substrate was evaluated, as shown in FIG. 3 (left to right).

The composite film exhibited a clean peel when manually peeled from the substrates, as illustrated by the absence of spotting and the absence of any residue of the heat-sealable coating layer visible on the surface of the substrates.

The coating/coating peel test (i.e. wherein the composite film was heat-sealed to itself) exhibited cohesive failure within the heat-sealable coating, indicating advantageously high adhesion strength between the heat-sealable coating layer and the primer coating layer.

TABLE 2

| | 1 (C) | 2 (C) | 3 | 4 | 5 | 6 | 7 | 8 | 9 | 10 | 11 | 12 |
|---|---|---|---|---|---|---|---|---|---|---|---|---|
| Acid copolymer resin: | | | | | | | | | | | | |
| Elvax 4260 | 100% | 95% | 94.50% | 98.9% | 99.89% | 62.00% | 63.90% | 89.00% | 94.50% | | | |
| Nucrel 960 | | | | | | | | | | 99.45% | | |
| Bynel 2022 | | | | | | | | | | | 99.45% | |
| Bynel 3101 | | | | | | | | | | | | 99.45% |
| Organic crosslinker: | | | | | | | | | | | | |
| CYMEL XW 3106 | 0% | 5.0% | 5.00% | 1.0% | 0.10% | 5.00% | 1.00% | 10.00% | 5.00% | 0.50% | 0.50% | 0.50% |
| Acid catalyst: | | | | | | | | | | | | |
| p-Toluene-sulfonic acid (PTSA) | 0% | 0.00% | 0.50% | 0.1% | 0.01% | 0.50% | | | | 0.05% | 0.05% | 0.05% |
| NACURE 5076 | | | | | | | | | 0.50% | | | |
| NACURE 5925 | | | | | | | | 1.00% | | | | |
| Sulfuric Acid | | | | | | | 0.10% | | | | | |
| Other Ingredients: | | | | | | | | | | | | |
| Piccolyte C115 | | | | | | 32.00% | 35.00% | | | | | |
| Syloid 620 | | | | | | 0.50% | | | | | | |
| Peel strength (g/25.4 mm) | | | | | | | | | | | | |
| Coating-coating | 683* | 702* | 1492 | 1589 | 1247 | 1392 | 1309 | 1605 | 1806 | 1055 | 1288 | 1153 |
| Peel strength to CPET | 516* | 439* | 766 | 750 | 643 | 721 | 684 | 748 | 812 | 686 | 801 | 792 |
| Peel strength to PP | 390* | 422* | 634 | 676 | 571 | 823 | 860 | 580 | 626 | 578 | 652 | 690 |

*coating residue observed on the substrate after peeling

The invention claimed is:

1. A composite film comprising a polyamide substrate layer having a first and second surface; a primer coating layer disposed on the first surface of the substrate layer, wherein the primer coating layer is derived from a composition comprising an acid copolymer resin, an organic crosslinker and an acid catalyst; and a heat-sealable polymeric coating layer disposed on the primer coating layer, wherein the heat-sealable polymeric coating layer has a thickness of between from 2 to 6 microns.

2. A composite film according to claim 1, wherein the polyamide substrate is uniaxially or biaxially oriented.

3. A composite film according to claim 1, wherein the polyamide is a thermoplastic crystallisable linear aliphatic polyamide.

4. A composite film according to claim 1, wherein the thickness of said polyamide substrate is from about 5 to about 150 μm.

5. A composite film according to claim 1, wherein the acid copolymer resin is selected from ethylene/acrylic acid (EAA) copolymers; ethylene acrylate copolymers functionalized with COOH groups; ethylene/methacrylic acid (EMAA) copolymers; methyl acrylate/acrylic acid (MAAA) copolymers; and ethylene/vinyl acetate (EVA) copolymers functionalized with COOH groups; and mixtures thereof.

6. A composite film according to claim 1, wherein the primer coating layer comprises from 60% to 99.9% by weight of the acid copolymer resin based on the total weight of the primer coating layer.

7. A composite film according to claim 1, wherein the organic crosslinker is selected from melamine crosslinking agents, polyisocyanate crosslinking agents, polycarbodiimide crosslinking agents, crosslinkers comprising multiple oxazoline groups, crosslinkers comprising multiple aziridine groups, and mixtures thereof.

8. A composite film according to claim 1, wherein the organic crosslinker is one or more melamine crosslinking agent(s).

9. A composite film according to claim 1, wherein the primer coating layer is derived from a composition comprising from 0.05% to 25% by weight of the organic crosslinker based on the total weight of the primer coating layer.

10. A composite film according to claim 1, wherein the acid catalyst is selected from an organic sulfonic acid, sulphuric acid and ammonium nitrate.

11. A composite film according to claim 1, wherein the acid catalyst is an organic sulfonic acid, wherein the organic sulfonic acid is selected from p-toluenesulfonic acid and dodecylbenzenesulfonic acid.

12. A composite film according to claim 1, wherein the primer coating layer is derived from a composition comprising from 0.01% to 2% by weight of the acid catalyst based on the total weight of the primer coating layer.

13. A composite film according to claim 1, wherein the primer coating layer further comprises a slip-aid, an anti-blocking agent and/or a tackifying resin.

14. A composite film according to claim 1, wherein the primer coating layer is derived from a composition further comprising a coating vehicle.

15. A composite film according to claim 1, wherein the primer coating layer has a dry thickness of 0.1 to 1.0 μm.

16. A composite film according to claim 1, wherein the heat-sealable polymeric coating layer is formed from a polymer selected from the group consisting of polyvinylidene chloride (PVDC), ethylene vinyl acetate (EVA), polyolefins, ethylene-acrylic acid copolymers, ethylene-methacrylic acid copolymers, and mixtures thereof.

17. A composite film according to claim 16, wherein the heat-sealable polymeric coating layer is formed from EVA polymer having a vinyl acetate content in the range of 9% to 40%.

18. A composite film according to claim 1, wherein the heat-sealable polymeric coating layer has a thickness of from 2 to 4 μm.

19. A composite film according to claim 1, wherein the composite film has a total thickness of no more than 60 μm.

20. A sealed container comprising a receptacle containing a food product, and a lid formed from a composite film as defined in claim 1.

21. A sealed container according to claim 20, wherein the food product is an ovenable meal.

22. A sealed container according to claim 20, wherein the receptable is made from Crystallized Polyethylene Terephthalate (CPET) or a polyolefin.

23. A sealed bag containing a food product, wherein the bag is formed from a composite film as defined in claim 1.

24. A method for manufacturing a composite film comprising:

(i) disposing a primer coating layer composition comprising an acid copolymer resin, an organic crosslinker and an acid catalyst in a coating vehicle onto a surface of a polyamide substrate;

(ii) drying the primer coating layer composition;

(iii) heating the dried primer coating layer composition to form a cured primer layer; and (iv) disposing a heat-sealable polymeric coating layer comprising a heat-sealable polymeric material in a second coating vehicle onto the cured primer layer; and (v) drying and/or heating the heat-sealable polymeric coating layer, wherein the heat-sealable polymeric coating layer has a thickness of between from 2 to 6 microns.

25. A method of packaging an ovenable meal, the method comprising using a composite film as defined in claim 1 as a lid in the packaging of an ovenable meal, said packaging further comprising a receptacle.

26. A method of packaging a food product, the method comprising using a composite film as defined in claim 1 as a bag for packaging of a food product.

\* \* \* \* \*